United States Patent [19]

Miller

[11] 4,204,413
[45] May 27, 1980

[54] TORQUE LIMITING DRIVE SHAFT ASSEMBLY

[75] Inventor: Paul W. Miller, Warren, Ohio
[73] Assignee: Wean United, Inc., Pittsburgh, Pa.
[21] Appl. No.: 849,191
[22] Filed: Nov. 8, 1977
[51] Int. Cl.² .............................................. F16D 7/00
[52] U.S. Cl. .................................... 64/30 E; 64/28 R
[58] Field of Search ................. 64/30 C, 30 E, 30 R, 64/28 R; 192/85 AT, 88 B

[56] References Cited

U.S. PATENT DOCUMENTS

| | | | |
|---|---|---|---|
| 1,148,998 | 8/1915 | Sears | 192/85 AT |
| 2,087,488 | 7/1937 | Stanley | 64/30 C |
| 2,093,281 | 9/1937 | Kreuser | 192/88 B |
| 2,111,422 | 3/1938 | Fawick | 192/85 AT |
| 2,583,117 | 1/1952 | Piper Roux | 192/88 B |
| 3,322,369 | 5/1967 | Haenelt | 192/85 AT |
| 3,547,244 | 12/1970 | Fergle | 192/88 B |
| 3,777,868 | 12/1973 | Sugahara | 192/88 B |
| 4,093,052 | 6/1978 | Falk | 192/88 B |

FOREIGN PATENT DOCUMENTS 973922 7/1960 Fed. Rep. of Germany .......... 64/30 C

*Primary Examiner*—Ira S. Lazarus
*Attorney, Agent, or Firm*—Daniel Patch; Suzanne Kikel

[57] ABSTRACT

The disclosure pertains to a drive shaft for machines such as roller levellers for processing steel strip. The shaft is made up of outer and inner members, the latter driving the former. Between the members is provided a frictional driving surface such as can be provided by brake lining. The inner member has an opening into which is introduced a pressure medium such as solution of soluble oil which in a controllable and predictable manner expands the inner member thereby allowing the establishment of a driving relationship between the members up to a given torque and on the experience of excessive and objectionable torques allowing relative movement between the members.

5 Claims, 4 Drawing Figures

TORQUE LIMITING DRIVE SHAFT ASSEMBLY

The present invention in a broader aspect pertains to a drive shaft for driving machines processing flat rolled metal strip such as roller levellers, single motor dual roll driven pinch rolls, single motor multi-roll driven bridles, and multi-roll single drive motor tension leveller drives and all such machines wherein different velocities may exist in roll to roll velocity relationships due to actual roll or gear diameter differential or to changing velocities due to strip thickness effect on effective roll radius.

In transmitting a driving torque to a working machine having a roll or rolls wherein high normal forces existing between the work piece and the machine roll or rolls prevent relative slippage occurring, a frequent problem under certain conditions is encountered in the failure of the drive system due to torsional wind up forces that develop. For example in the drive shafts provided for roller levellers processing relatively thick long metal strips in which the size of the drive shafts are substantially limited due to the size, number and closeness of the leveller rolls much difficulty has been experienced with shaft failures.

In this application the torsional wind up forces are developed when the relative small diameter rolls are caused to level the relative heavy strip because of the high coefficient of friction and the high pressure of the roll on the strip resulting when the strip is caused to take a sinusoidal wave path through the leveller. When the strip is long these wind up forces cannot relieve themselves before failure of the drive shaft occurs.

A second example of a like condition occurs when pinch rolls are driven by a single motor through gearing that causes each roll of the pair to turn at the same angular velocity. The rolls when relatively different in diameter must turn at differing peripheral velocity which will cause torsional wind up of the drive often resulting in drive component failure when the rolls are held from slipping by the magnitude of normal force and the coefficient of friction.

It is an object therefore of the present invention to provide a torque limiting drive shaft assembly that allows a required torque to be transmitted but which will be self relieving on the experience of objectional torques.

More particularly the present invention provides a drive shaft made up of outer and inner members the latter driving the former or vice versa. Between the members is provided a frictional driving surface which may consist of a friction material such as brake lining fixed to one member acting against the friction surface of the second member or it may be the surface of one member acting directly in friction agains the surface of the second member.

The inner member has an opening into which is introduced a pressure medium such as oil which in a controllable and predictable manner expands the inner member thereby allowing the establishment of an adjustable driving relationship between the members up to a given torque and on the experience of excessive and objectionable torques allowing relative movement between the members.

More particularly the present invention provides a torque limiting drive shaft assembly comprising an outer driven member being connected to either a rotational torque generating means or means subjected to a load in performing work; an inner driven member having a portion that is received in the outer driven member in a manner to drive or be driven by said outer member, said inner driven member being connected to either one or the other of said torque generating means or said working means that said outer member is not connected to; an opening in said inner driven member extending at least into the axial central portion of said shaft assembly and constructed to receive a medium in a manner to pressurize and seal said medium; a given portion of said inner driven member being constructed so that it is controllably expandable by said pressure medium; and contacting frictional surfaces arranged on said inner and outer members in said given portion of said shaft assembly in a manner to transfer rotatable torque between said members and to allow relative rotation between said members on the experience of a given load by said working means.

These objects, as well as other novel features and advantages, of the present invention will be better understood when the following description of two embodiments are read along with the accompanying drawings of which:

Figure 1:
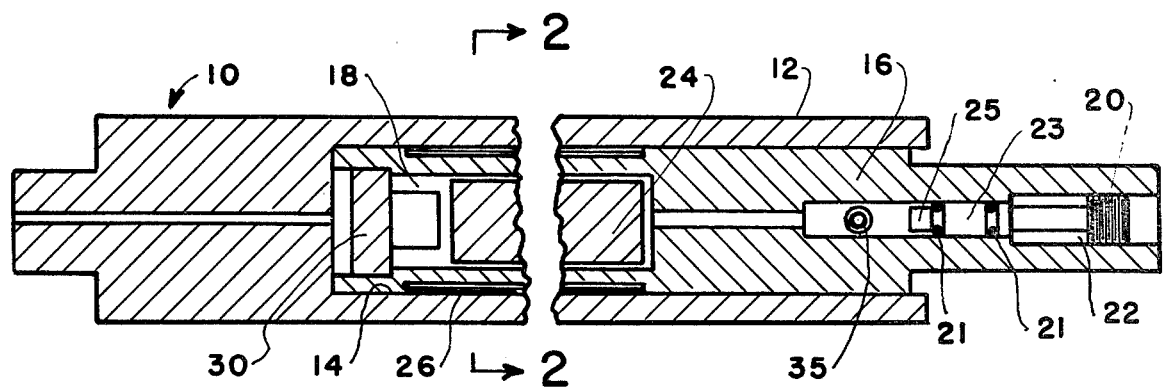
FIG. 1 is a sectional view of a drive shaft assembly built in accordance with the present invention.
Figure 2:
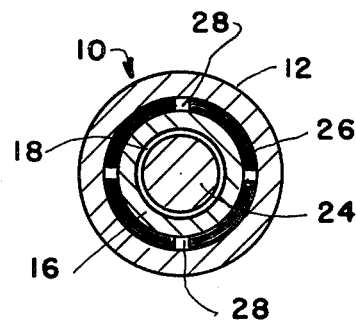
FIG. 2 is a sectional view taken on lines 2—2 of FIG. 1.

In referring first to FIGS. 1 and 2 there is illustrated a rotatable shaft assembly 10 for transmitting a driving force from one end connected to a gear unit or motor to the other end connected to an adjacent end of a roller such as a roller for levelling heavy gauge long carbon steel strip. In the usual manner, these connections will be made through couplings, not shown.

The shaft assembly 10 includes an outer circular relatively strong metal member 12 such as bronze having a partial axially extending opening 14 into which is received an inner member 16 made up relative to the outer member of a physically different relatively strong metal, for example rolled or cast steel. The thermal coefficient of expansion value of the outer member may be on the order of $12 \times 10^{-6}$ inches per inch per °F. and a value for the inner member may be on the order of $6.5 \times 10^{-6}$ inches per inch per °F. As noted the outer end of these members have projections for connecting to either the driving means such as a motor or the driven load such as a leveller roller. The inner member 16 internally is provided with an axial extending opening 18, an enlarged diameter portion of which is centrally located relative to the shaft assembly. The opening 18 extends to the right end of the inner member 16, as one views FIG. 1 where it is plugged by an adjustable threaded nut assembly 20 which may move along the entire length of the extreme outer threaded portion 22 of the opening 18. The plug assembly 20 displaces a piston 23 which is provided with a pair of seal rings 21. The inner end of the piston 23 has a flat surface 25 for working against the pressure medium.

A relatively incompressible filler strong metal piece 24 is located in the enlarged and central portion of the opening 18 to reduce the volume of pressure medium required to effect a controlled expansion of the central portion of the member 16. The filler 24 is designed to reduce the medium capacity by one-fourth or less the capacity needed if no incompressible filler is used. The filler piece 24 in reducing the total volume of the medium required to fill the opening 18 permits an appreciable change in the total pressure of the medium by the volume of the medium that is displaceable on the adjustment of the plug assembly 20. The pressure medium can be of several different types such as water, soluble oil in water, glycerin, such as pure glycerin in pure water, or mercury depending on the service characteristics desired relative to pressure medium compressibility and thermal expansion co-efficient in relationship to the particular desired characteristics of the shaft assembly and the operating conditions.

As compared with pure water, the pressure medium under pressure should exhibit a relatively lesser volumetric decrease and upon temperature change will experience a volumetric change per unit volume about equal to that of pure water per unit volume for the same temperature change. In the form of the shaft assemblies illustrated in FIGS. 1-4 a soluble oil in water pressure transmitting medium is intended to be used in the proportion of about 5 parts of volume of water to 1 part of volume of oil which has satisfactory compressibility and thermal expansion characteristics when used in shaft assemblies having the inner member made from steel and the outer member made from bronze which have been found satisfactory for certain levelling operations on carbon steel strip.

It is to be noted that there is an interdependent relationship between the expansion characteristics of the pressure medium and the thermal coefficient of expansion of the outer member 12 so that the total thermal expansion of the pressure medium and the thermal coefficient of expansion of the inner member 16 is less than the thermal coefficient of expansion of the outer member 12. The adherence to this interdependency assures the ability of the shaft assembly delivering a given torque within a specified range. In a case employing the coefficient of expansions given above for the outer and inner members 12 and 16 respectively, and employing soluble oil in water as the medium having a compressibility characteristic of $$3.35 \frac{cu. in.}{cu. in.} / 10^6 \#/in.^2$$

the total thermal expansion of pressure medium and the inner member was $8.7 \times 10^{-6}$ in./°F., while the thermal expansion of the outer member was $12 \times 10^{-6}$ in./°F. The range of effective adjustment of the plug assembly 20 with respect to the compressibility of the pressure medium such as soluble oil in water in the disclosed form of the present invention is capable of pressurizing the medium in excess of 6,000 PSI. It will also be noted that within the parameters being discussed, the soluble oil in water has a compressibility characteristic that will allow a very high pressure to be produced with a very small volumetric change of the medium. Moreover, the compressibility of the medium such as soluble oil in water is such that the plug assembly 20 and its medium contacting surface can be maintained relatively small and yet permit the development of relatively high pressures in the medium with low torque requirements for the adjustments of the plug assembly.

Figure 4:
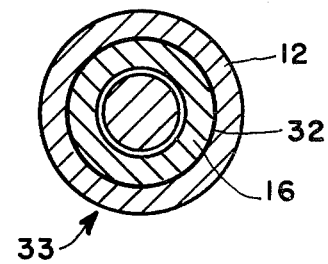
FIG. 4 is a sectional view taken on lines 3—3 of FIG. 3.
Figure 3:
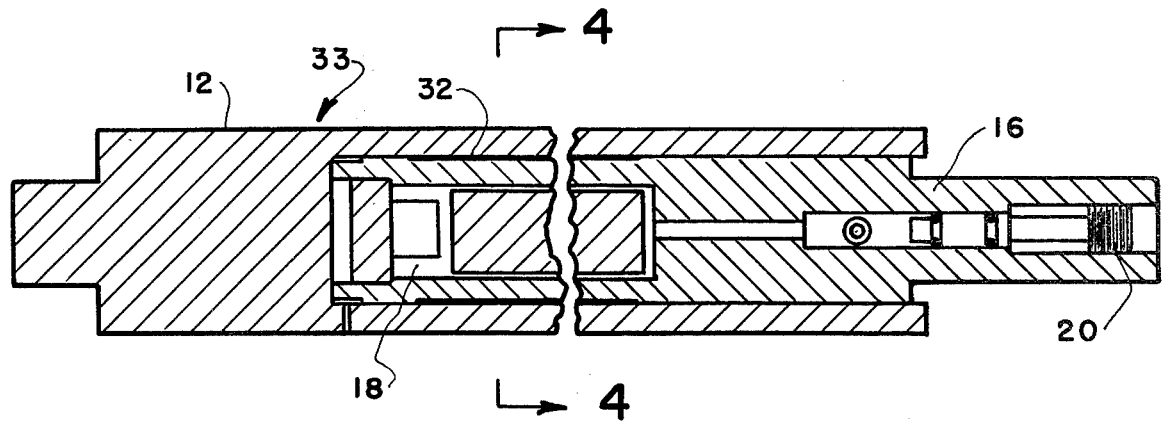
FIG. 3 is a view similar to FIG. 1 of a second embodiment of the present invention.

Between the centrally contacting surfaces of the outer and inner members 12 and 16 there is provided a relative high coefficient of friction surface such as brake lining 28, FIGS. 1 and 2, or prepared metal to metal surface 32 shown in FIGS. 3 and 4. Several linings available on the market can be employed, one such being Grey Rock RM 4020 as manufactured by Raybestos Manhattan. The brake lining 26 is arranged in quadrant fashion and received between radial projections 28 of the inner member 16. It will be noted that the left hand end of the opening 18 as viewed in FIG. 1 is sealed by a member 30. In order to obtain an accurate and quick measurement of the pressure medium there is provided a gauge port 35 located in the opening of the inner member 16 inward of the piston 23.

In FIGS. 3 and 4 instead of applying brake lining in cases where a substantially higher total friction is desired at relatively equal liquid medium pressure a metal to metal contacting surface 32 is employed. This metal to metal contacting surface allows the development of high normal force between contacting surface at relative low internal medium pressure because of the high modulus of elasticity in compression of the metal to metal contacting surfaces as compared with the brake lining unit compressibility. The choice of the materials for the inner and outer surfaces for a particular torque service can also require the use of a coating on one or the other of the contacting surfaces. A coating such as tungsten carbide with a 100 RMS finish when working against a 40B Rockwell Hard Steel surface will produce a desirable coefficient of friction and wear and service quality. Aside from the different contacting surface the shaft assembly 33 FIGS. 3 and 4 is generally the same as the shaft assembly 10 of FIGS. 1 and 2.

In operation depending on the permissible and safe torque characteristics of shaft assemblies 10 and 33 the pressurized medium introduced through the opening 18 is brought to the required initial value by adjusting the plug assembly 20. The actual required pressure, a function of the fit tolerance existing between inner and outer shaft members, but desirably between 4000 and 6000 PSI for an assembly as illustrated in FIG. 1 is determined by measuring the diameter of the outer member or by an actual check of the torque developed by the shaft when relative motion between inner and outer shaft members occurs.

The adjustable and controlled pressure in the sealed opening 18 will create a controllable frictional force between the outer and inner members 12 and 16 through the brake lining 26, or tungsten carbide 32 or metal surface contact as previously described as related to the maximum torque capacity desired, as for example in roll drives of a $2\frac{1}{2}''$ roller leveller where this desirable capacity is about 5000 inch pounds. Upon exceeding this maximum torque value, the braking lining, tungsten carbide or metal surface will allow slippage or relative rotational movement between the inner and outer members 12 and 16 thereby relieving the shaft assembly from any excessive and objectional torque forces. It will be appreciated that the maximum torque values and the slippage torque value can be easily adjusted by adjusting the pressure of the pressure medium.

While the two embodiments illustrated of the present invention have been discussed and described as applied to a roller leveller for steel strip, it will be appreciated by those skilled in the art that the invention will have a wide range of different applications some of which were noted earlier, and can be applied to any rotational applications driving system where torsional windup forces are of concern.

In accordance with provision of the patent statutes, I have explained the principle and operation of my invention and have illustrated and described what I consider to represent an important embodiment thereof.

I claim:

1. A torque transmitting and regulating drive shaft assembly employable in a mechanical direct driving system wherein the assembly is connected to a rotatable driving means and a rotatable driven means and wherein the assembly in operation is subjected to detrimental mechanical accumulated strain, such as torque wind up, said drive shaft assembly comprising:

an outer torque transmitting member being connected to either said driving means or said driven means, an inner torque transmitting member having a portion that is received in the outer member in a manner to drive or be driven by said outer member, said inner member being connected to either one or the other of said driving means or said driven means that said outer member is not connected to, an opening in said inner member extending at least into the axial central portion of said shaft assembly, and constructed to receive pressure medium in a manner to pressurize and seal said pressurized medium, a given portion of said inner member being constructed so that it is controllably expandable by said pressurized medium, and contacting frictional surfaces arranged on said inner and outer members in said given portion of said shaft assembly in a manner to transmit rotatable working torque between said members and wherein the thermal coefficient of expansion of said inner member and the thermal expansion of said pressure medium is always less than the thermal coefficient of expansion of said outer member, said outer member having strength and impact characteristics substantially equal to said inner member and constructed and arranged to be unrestrained as far as its ability to radially outwardly expand and during operation said inner and outer members are continuously subjected to the stresses of said expansion, said working torque, and torque windup, and while so subjected, to control the heat generated thereby, whereby said inner and outer members are self-compensating in the manner to obtain a pressure equilibrium condition with respect to said members to maintain a predetermined torque value for said driving assembly, and when said torque value is exceeded to permit relative movement between said members while transmitting the required torque.

2. A torque limiting and regulating drive shaft assembly according to claim 1 wherein said medium has a compressibility characteristic that will allow a relatively high pressure to be produced with a small volumetric change, said opening having a reduced area at one end of its ends for receiving a manual mechanical adjustment means in a manner that said mechanical means is exposed to said medium, said area of said one end being considerably smaller than the area of said opening whereby the total force of said medium against said mechanical means is maintained relatively low to allow easy mechanical adjustment.

3. A torque limiting and regulating drive shaft assembly according to claim 2 wherein said pressurized and sealable condition of said opening is established in part by said manual adjustment means connecting with said opening and controllably operable so as to vary the pressure of said pressure medium.

4. A torque transmitting and regulating drive shaft assembly according to claim 1 wherein said outer member and its said contacting frictional surface is made of bronze or a similar metal having a sufficient strength to transmit a desired operational maximum torque.

5. A torque limiting drive shaft assembly according to claim 1 wherein said frictional surfaces comprise tungsten carbide.

* * * * *